No. 611,042. Patented Sept. 20, 1898.
I. N. PEARSON.
GLASS FINISHING MACHINE.
(Application filed July 23, 1897.)
(No Model.) 2 Sheets—Sheet 2.
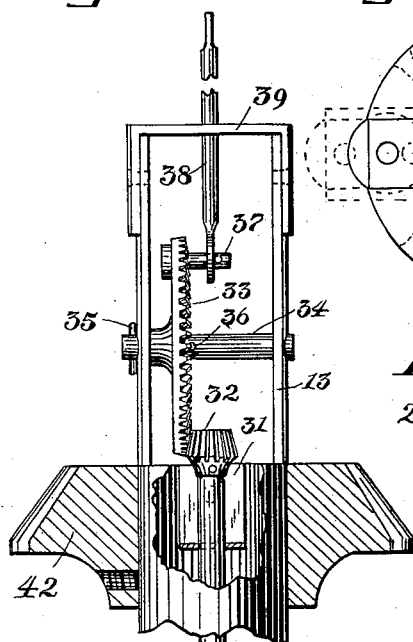
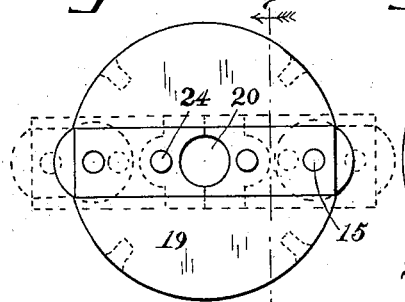
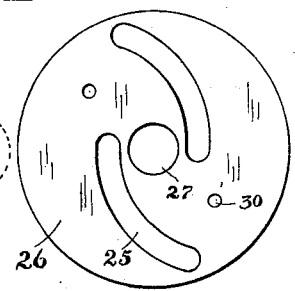
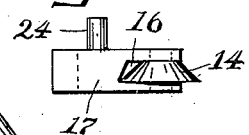
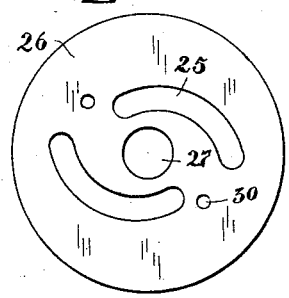
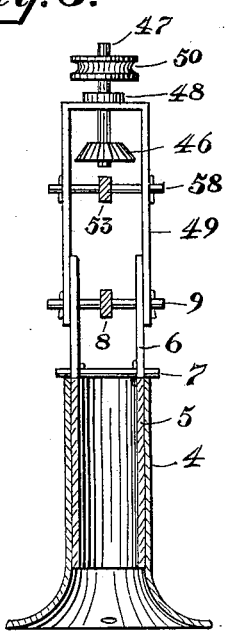
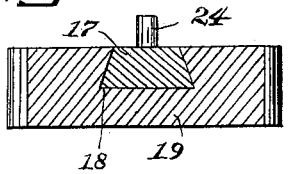
Witnesses
Inventor
Isaac N. Pearson
By V. H. Lockwood
His Attorney.

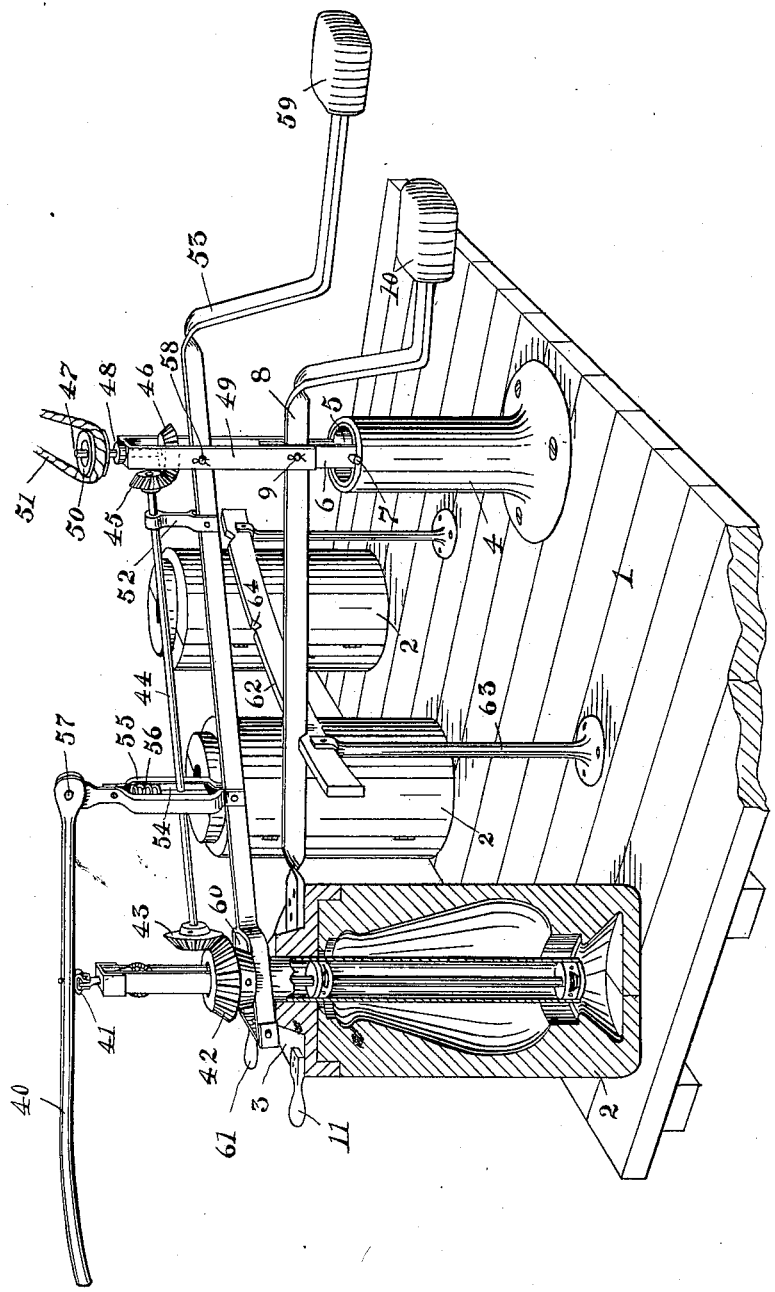

UNITED STATES PATENT OFFICE.

ISAAC NEWTON PEARSON, OF GAS CITY, INDIANA.

GLASS-FINISHING MACHINE.

SPECIFICATION forming part of Letters Patent No. 611,042, dated September 20, 1898.

Application filed July 23, 1897. Serial No. 645,734. (No model.)

*To all whom it may concern:*

Be it known that I, ISAAC NEWTON PEARSON, of Gas City, county of Grant, and State of Indiana, have invented a certain new and useful Glass-Finishing Machine; and I do hereby declare that the following is a full, clear, and exact description thereof, reference being had to the accompanying drawings, in which like numerals refer to like parts.

My invention relates to a glass-finishing device adapted for cutting away the overflow of hollow blown-glass articles—such as lantern-chimneys, fruit-jars, milk-bottles, and similar articles. I seek to accomplish this result by inserting one or more rotary cutters in the blown-glass article while in the mold, and thereby severing the overflow from the body of the article by an internal application of the cutter. There are many advantages arising from this method and means of removing the overflow. It can be done while the article is still in the mold and immediately after it has been blown. By making the cut at a point where a bead is located a smooth surface is left at the point of severance, and further treatment of the end or ends of the glass article to make it smooth is therefore unnecessary.

The device is also so simple and easily operated that a boy can operate it for three molds, thereby dispensing with the services of at least two persons, who under methods heretofore employed were required to remove the overflow of the blown glass and to smooth and finish the end of the article. Where the overflow of glass is to be severed at both ends—as, for example, in the manufacture of lantern-globes—two sets of cutters are provided, as shown in the drawings of this case; but where the overflow is to be removed from only one end—as, for example, fruit-jars, milk-bottles, &c.—only one cutter is needed.

The general idea or means embodied in my invention will be understood from the detailed device shown and described in the accompanying drawings and the description following.

Figure 1 is a perspective of my glass-finishing device mounted in connection with three molds for the manufacture of lantern-chimneys, one of said molds being in vertical section. Fig. 2 is an elevation of the cutter-shaft, parts being broken away and other parts being in section to bring out the various features of it. Fig. 3 is a plan view of the cutter with the cutting-disks extended in dotted lines. Fig. 4 is a side elevation of one of said cutting-disks and its holder. Fig. 5 is a plan view of the cam-disk employed at the lower end of the cutter-shaft for spreading the cutting-disks, as seen in Fig. 3. Fig. 6 is a plan view of the cam-disk used to cut the upper end of the glass article. Fig. 7 is a cross-section on the line 7 7, Fig. 3. Fig. 8 is a vertical section of the turn-table arrangement for carrying the balance-levers.

In detail I show on a suitable board platform 1 three molds 2, in which lantern-chimneys may be blown. The particular construction of the mold is immaterial, excepting that the top portion be provided with an annular offset or recess to receive the annular downwardly-extending flange of the lid 3. The lid should fit loosely enough to permit its removal without difficulty.

I place the molds on a platform in a curved line forming the segment of a circle, at whose center I mount a turn-table arrangement, substantially as shown. The lower portion of it consists of a pipe 4 with a flaring base, whereby it is secured to the platform. Within it I mount another tube or pipe 5, cut at its upper end on each side to form the upwardly-extending arms 6. Through these I extend the bolt 7 loosely and far enough to rest upon the upper end of the pipe 4. By this means the inner pipe 5 turns on pipe 4, and between its arms 6 I mount the balance-lever 8 on the bolt 9. The lever 8 has a weight 10 on one end and at the other end is secured to the lid 3. The weight 10 should be such as to almost balance the lid 3; but the lid end should be slightly heavier, so that by gravity it would settle. The lid is provided with a handle 11, whereby it can be elevated, moved, and depressed.

The lid 3 is centrally apertured to receive and permit the reciprocation of the cutter-shaft 12. This shaft consists of a tube with the upper end cut away on each side to form a pair of oppositely-placed vertical arms. (To be seen in Figs. 1 and 2.) The shaft 12 carries the cutters, the number of them being one or two, as the nature of the work may require. I have shown herein a device for use in the manufacture of lantern-chimneys, and therefore, both ends having to be cut, an upper and a lower cutter is provided, as seen in Figs. 1 and 2. The cutters consist of little disks 14, beveled on one side and flat on the other, as seen in Figs. 2 and 3. They are mounted on a pivot 15 in the recess 16 in a block or holder 17. The width of said block 17 is greater on one side than on the other, so that it can slip or slide in the dovetailed groove 18, that extends radially across one side—either the upper or lower side—of the cylindrical block, frame, or disk 19. The said groove 18 therefore furnishes a guideway for the outer or radial movement of the holder 17 and cutting-disks 14. Said groove should be large enough to permit the easy reciprocation of said holders 17. The inner ends of said holders 17 are provided with a semicircular recess 20, curving in opposite directions, so that when the holders 17 are brought together, as shown in Fig. 3, a round aperture will be formed, as there seen. The length of the sliding holder 17 should be such as to permit them to be so far withdrawn together in the groove 18 that the cutting-disks 14 will extend but slightly beyond the periphery of the thick disk 19.

The thick disk 19 has a diameter equivalent to the interior diameter of the cutter-shaft 12 and is secured therein by the screws 21 at the point where it is desired to cut the glass article. Suitably-shaped apertures 22 are cut in opposite sides of the cutter-shaft 12 for the passage of the holder 17, that holds the cutting-knives 14. Said cutting-knives and their holding-blocks are extended through the openings 22 in the cutter-shaft 12 when it is desired to cut the glass. After the glass has been cut they are withdrawn through said opening to the position shown in Fig. 3. In that position the cutting-knives extend but slightly beyond the periphery of the thick disk 19. At the point where the cutting mechanism is secured to the cutter-shaft I have turned down the said cutter-shaft, as seen at 23 in Fig. 2, for the purpose of preventing the cutting-disks 14 and the screws 21 from interfering with the ready passage of the cutter-shaft 12 through the aperture in the lid 3.

The reciprocation of the cutting-knives and their holder 17 is effected as follows: Said holders 17 are provided with pins 24, that are adapted to extend through the cam-slots 25 in the cam-disks 26. Said cam-disks are provided with a central aperture 27, through which the shaft 28 extends. The cam-disks 26 are secured to said shaft by the collar 29 and the rivets or pins 30 through the collar and cam-disks. The cam-disks are therefore rotated by means of the rotary shaft 28, and when they are rotated the cam-grooves 25, which extend tangentially from an imaginary line concentric with the cam-disk, actuate the holders 17 and cutting-knives 14 through the pins 24. These said cam-grooves push the pin 24 outward or draw it inward, according to the direction of rotation of the cam-disk.

I show two cam-disks in Figs. 5 and 6, and they differ only in the tangential angle of the cam-grooves. The cam-disk shown in Fig. 5 will force the cutting-knives 14 farther outward, so as to cut a glass article of larger dimensions than the knives that are actuated by the cam-disks shown in Fig. 6. This is necessary in making lantern-chimneys, because the diameter of the base of such articles is greater than the diameter of the top. The thick disk 19 and the cutting-knives 14 are so placed in the cutting-shaft 12 that the bevel of the cutting-disk 14 will be away from the body of the glass article to be cut, or, in other words, the straight side of the cutting-disk 14 will be adjacent to the body of the glass article. This is for the purpose of making a clean cut and pushing away the overflow. Furthermore, a rounded edge will be formed in the soft glass at the point where it is cut by the flat side of the cutting-disk. The overflow is cut away from articles of this kind at a point registering with an external bead in the glass article, so that the bead renders the outer edge smooth, and the cut made by the smooth side of the cutting-disk 14 in the soft glass will leave the inner edge smooth. Attention may be called to the fact that in Fig. 1 the glass lantern-chimney is not shown in the mold, it being omitted for the sake of clearness; but the conformation of the glass chimney would be the same as the mold.

The shaft 28 is rotated only partially and only for the purpose of throwing the knives in and out, as seen in Fig. 3. The upper end of said shaft is mounted in a bracket 31, secured on the inside of the cutter-shaft 12. The lower end of the shaft 28, as I have before stated, is mounted in the thick disks 19. At the upper end of said shaft a beveled pinion 32 is secured, that is driven by a beveled gear 33, mounted loosely on a bolt 34, that extends through the pair of vertically-extending arms 13. The gear 33 and the bolt 34 are held in position by the pins 35 and 36. The gear 33 has a wrist-pin 37, that carries a connecting-rod 38, reciprocating through an aperture centrally located in the strap 39, that is fastened over the upper end of the arms 13 to hold them together. The rod 38 is actuated by the horizontal hand-lever 40. (To be seen in Fig. 1.) The connection between said hand-lever 40 and the rod 38 is effected with a swivel 41, which permits said rod 38 to be rotated when the cutting-shaft 12 is rotated. By slightly elevating or lowering the outer end of the hand-lever 40 the gear 33 is partially rotated, and thereby the shaft 28. A quarter-rotation will move the cutting-knives 14 to their outward position or withdraw them to their inward position. When said cutting-knives are in their outward position and the operator is ready to cut the glass, it is accomplished by the rotation of the cutting-shaft 12. The hand-lever 40 is pivotally mounted at 57 to the upper end of the guide-bars 55.

The cutter-shaft 12 is supported and balanced by the balance-lever 53, that is pivoted on the bolt 58 in the arms 59. One end is provided with a weight 59 and the other end is provided with a fork 60, that surrounds the cutter-shaft immediately below the collar of the beveled gear 42. It is provided with a handle 61, whereby the end of the lever 53 and the cutter-shaft and cutter mechanism may be elevated out of the mold or depressed into it. By pushing inward on said handle 61 and lever 53 the frame 49 will be moved back on its pivot and the gears 43 and 45 will disengage the gears 42 and 46, so as to throw the cutting mechanism out of gear. This, however, is of slight importance, because the cutting-disks, even if the cutter-shaft is rotating, will not engage the glass until the lever 40 is operated to throw the cutting-disks out into engagement with the glass.

In operation the boy first places the lid 3 over the mold, as shown in Fig. 1, and then depresses the cutter-shaft until it reaches its limit of movement. Then he actuates the hand-lever 40, that throws the knives out into engagement with the glass. As soon as the glass is cut the hand-lever 40 is released, the cutter-shaft elevated out of the mold, and the lid 3 lifted off the mold. The vertical movement of the lid is obviously very slight to enable it to be removed from the mold.

The vertical movement of the cutter-shaft when used in making lantern-chimneys is considerable; but when used only in cutting the tops of blown-glass articles, such as fruit-jars and milk-bottles, the vertical movement of the cutter-shaft is very slight. The movement of this is rendered easy by the balance-levers.

In order to properly locate the parts, a guide-bar 62 is used, that is curved on a line concentric with the curvature of the row of molds. It is supported on the posts 63, that are secured to the platform. In its upper edge, on a line directly from the center of the mold to the center of the turn-table arrangement, I provide a notch 64 to receive the balance-lever 8.

What I claim as my invention, and desire to secure by Letters Patent, is—

1. The combination with a mold for blown-glass articles, of a cutter-shaft that is inserted within the glass article, while in the mold, a disk carrying rotary cutters mounted in said cutter-shaft, and means for rotating the cutter-shaft.

2. The combination with a mold for blown-glass articles, of a removable lid that is centrally apertured, a cutter-shaft that is inserted through such aperture in the lid within the glass article while in the mold, a disk carrying rotary cutters mounted in said cutter-shaft, and means for rotating the cutter-shaft.

3. The combination with a mold for blown-glass articles, of a removable lid having a central aperture, a cutter-shaft that is inserted through said aperture within the glass article while in the mold, a cutter mounted in said shaft, means for rotating the cutter-shaft, and balance-levers for supporting said lid and cutter-shaft.

4. The combination with a mold for blown-glass articles, of a removable lid centrally apertured, a cutter-shaft inserted through the lid into the glass article while in the mold, a cutter mounted in said shaft, balance-levers for supporting the lid and cutter-shaft, and a vibrating support in which said balance-levers are pivoted.

5. The combination with a series of molds for blown-glass articles arranged in a curved line, a turn-table support mounted at the center, a removable lid adapted to fit over any one of said molds, a cutter-shaft that is inserted through a central aperture in said lid within the glass article while in the mold, a cutter carried in said shaft, means for rotating the cutter-shaft, and balance-levers mounted in the turn-table support for said lid and cutter-shaft.

6. The combination with a series of molds for blown-glass articles arranged in a curved line, of a cutter-shaft that is inserted within the glass article while in the mold, a cutter mounted in said cutter-shaft, a balance-lever for supporting said cutter-shaft, a tilting turn-table or rotary support on which said balance-lever is pivoted, means for transmitting power from said turn-table or rotary support to the cutter-shaft for actuating it, and means for transmitting power from some suitable source to said cutter-shaft actuating the mechanism.

7. The combination with a series of molds arranged in a curved line, a removable lid adapted to fit over a mold and having a central aperture, a cutter mechanism that is inserted through said lid into the glass article while in the mold, means for actuating said cutter mechanism, a turn-table or rotary support located at the center of the curved line in which the molds are placed, a balance-lever for supporting the removable lid, and a guide-bar mounted between the series of molds and the turn-table for the balance-lever to be moved upon, said guide-bar having a notch opposite each mold to receive said balance-lever.

8. In a device for internally cutting blown-glass articles, a rotatable shaft provided with two sets of radial slots or grooves one at each end of the article to be cut, blocks or holders loosely mounted in such slots or grooves, cutting-disks rotatably mounted in the blocks or holders, the two sets of cutting-disks being beveled on opposite sides with relation to each other, and means for reciprocating the cutter blocks or holders, substantially as set forth.

9. In a device for internally cutting blown-glass articles, a rotatable tubular shaft provided with two sets of radial slots or grooves, one at each end of the article to be cut, blocks or holders loosely mounted in such slots or grooves and provided with pins extending therefrom, the disks rotatably mounted in the blocks or holders, a cam-disk for each set of cutter blocks or holders provided with cam-shaped grooves through which the pins on the cutter blocks or holders extend, the curvature of the cam-shaped grooves in each cam-disk varying so as to force the cutting-disks into engagement with a glass article whose ends vary in diameter, and means for actuating the cam-disks.

10. In a device for internally cutting blown-glass articles, a tubular cutter-shaft that is inserted within the glass article while in the mold, a cutter mounted in said tubular shaft, means for rotating said tubular shaft, a shaft mounted centrally in said tubular shaft, means carried on said central shaft for adjusting the cutter or knives, a pinion secured to the upper end of said central shaft, a gear mounted in the framework above the tubular shaft that meshes with said pinion, and reciprocating rods pivotally connected with said gear adapted to partially rotate it, and a hand-lever for actuating such reciprocating rod, substantially as set forth.

In witness whereof I have hereunto set my hand this 19th day of July, 1897.

ISAAC NEWTON PEARSON.

Witnesses:
WILLIAM P. ALEXANDER,
WILLIAM W. MCCUNE.